May 24, 1932.                M. H. KINGHAM                1,860,101
                                RICE DRIER
                            Filed Dec. 10, 1930

Inventor
Mark H. Kingham,
By Clarence A. O'Brien
Attorney

Patented May 24, 1932

1,860,101

UNITED STATES PATENT OFFICE

MARK H. KINGHAM, OF LAKE CHARLES, LOUISIANA

RICE DRIER

Application filed December 10, 1930. Serial No. 501,375.

This invention relates to an especially constructed receptacle or container somewhat in the nature of a relatively small shallow crate primarily designed for reception of rice, and constructed with a view toward providing a practical and economical device to aid in conditioning, storing and drying rice to render it more acceptable to a ready market.

Various crude methods and means are at present resorted to in rice fields for handling and curing rice. Most of these devices are expensive and unhandy and are not generally economical enough to permit the small farmer to utilize them. The result is that such rice on the small farm is subjected to deterioration and waste.

With the foregoing objections in mind, I have evolved and produced a simple and economical screen bottom box of appropriate proportions and construction to permit it to be employed for stacking these containers in an especially designed drying house to be subjected to a special drying process for effectively curing the rice in an expeditious and dependable manner, thereby minimizing loss of the rice, and rendering it more desirable for marketing purposes.

Figure 1:
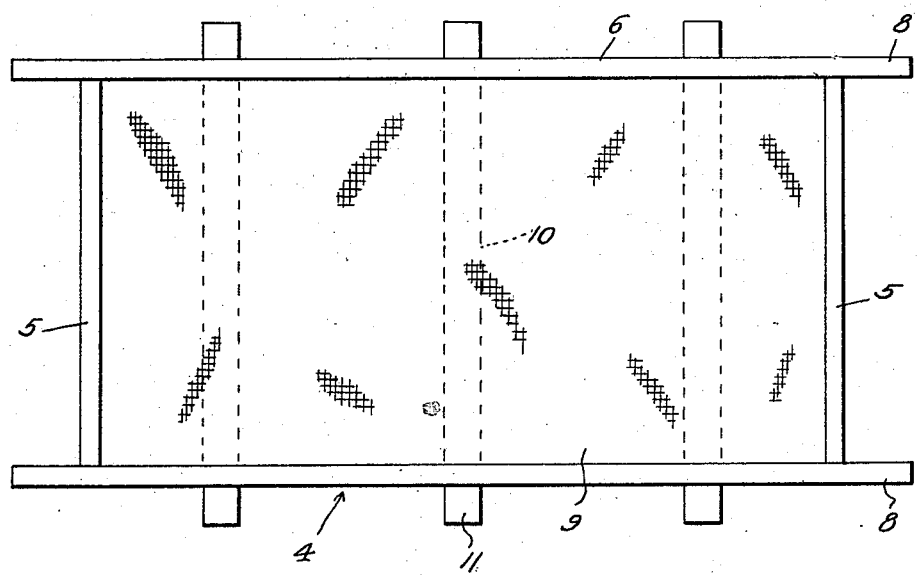
Figure 1 is a top plan view of a device constructed in accordance with the invention.
Figure 2:
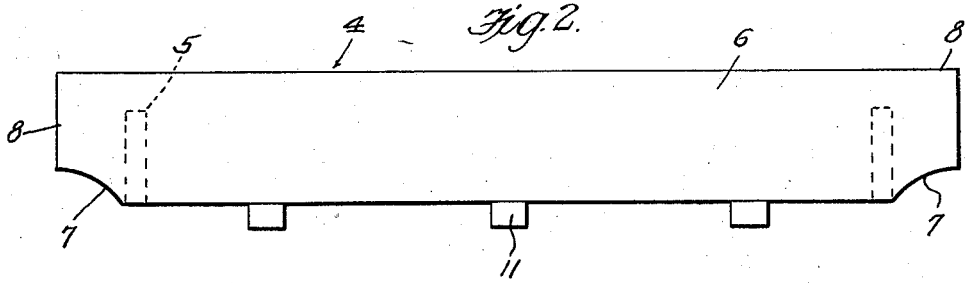
Figure 2 is a side view.
Figure 3:
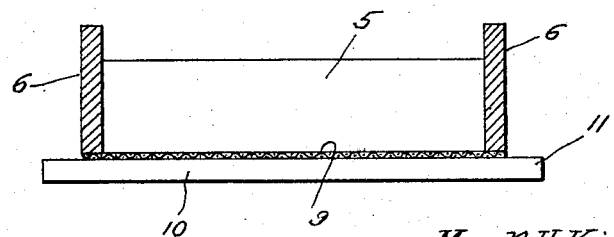
Figure 3 is a cross sectional view.

The device, broadly speaking, is in the form of a rectangular box-like open top container or receptacle and is generally denoted by the numeral 4 in the drawings. It comprises spaced parallel end walls 5 located between the end portions of the spaced parallel longitudinal side walls 6. The end portions of the last named walls project beyond the end walls and are notched along their lower edges as at 7 in Figure 2 to provide a handgrip 8.

The bottom of the box is in the form of a close mesh screen 9 designed to facilitate circulation of air therethrough. Across the bottom and at longitudinally spaced points are transverse cleats 10 whose end portions 11 project beyond the side walls 6 to serve as spacing elements when stacking the boxes or crates one or the other in the curing house.

It is understood that the gist of the invention is in the provision of an appropriately proportioned receptacle sometimes referred to as a crate wherein the same is provided with end handles to facilitate, filling, storing and curing. Particular importance is placed on the screen bottom to facilitate the circulation of air for drying purposes. Likewise the provision of the transverse cleats 10 is important in that these provide rests to facilitate packing of the boxes in tiers in the curing house. Then too, the extension of the end portions 11 constitute spacing means for spacing the boxes of the adjacent tiers from each other so as to leave air channels therebetween to further facilitate circulation of air for drying purposes.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A grain drying device of the class described comprising a substantially rectangular portable box-like open top receptacle comprising a screen bottom, transverse end walls, and longitudinal spaced parallel side walls, the end portions of the side walls projecting beyond the adjacent ends of the end walls and having their lower edge portion notched to provide extensions constituting hand grips, a plurality of transversely disposed longitudinally spaced cleats disposed across the underside of the screen bottom and attached to the side walls, and forming supporting means for portions of the screen and the outermost cleats being spaced inwardly from the ends of the screen, the ends of said cleats projecting beyond the side walls to provide spacing extensions to space the respective containers of stacked tiers from each other to facilitate circulation of air between the tiers for the purpose specified.

In testimony whereof I affix my signature.

MARK H. KINGHAM.